United States Patent
Liikanen

[19]

[11] Patent Number: 6,157,511
[45] Date of Patent: *Dec. 5, 2000

[54] DISK DRIVE WITH VARIABLE-PHASE SERVO BURST PATTERNS

[75] Inventor: Bruce Liikanen, Berthoud, Colo.

[73] Assignee: Maxtor Corporation, Longmont, Colo.

[ * ] Notice: This patent is subject to a terminal disclaimer.

[21] Appl. No.: 09/300,570

[22] Filed: Apr. 27, 1999

Related U.S. Application Data

[63] Continuation of application No. 08/940,588, Sep. 30, 1997, Pat. No. 5,923,492.

[51] Int. Cl.[7] .................................................. G11B 5/596
[52] U.S. Cl. ..................................... 360/77.08; 360/77.02
[58] Field of Search .......................... 360/75, 48, 77.08, 360/77.01, 77.02, 77.07, 78.04, 78.14, 49

[56] References Cited

U.S. PATENT DOCUMENTS

| | | | |
|---|---|---|---|
| 4,783,705 | 11/1988 | Moon et al. | 360/77.08 |
| 5,255,136 | 10/1993 | Machado et al. | 360/77.02 |
| 5,384,671 | 1/1995 | Fisher | 360/49 |
| 5,544,135 | 8/1996 | Akin, Jr. et al. | 360/46 X |
| 5,739,972 | 4/1998 | Smith et al. | 360/77.03 |
| 5,901,003 | 5/1999 | Chainer et al. | 360/51 |
| 5,923,492 | 7/1999 | Liikanen | 360/75 X |

OTHER PUBLICATIONS

Feng, "Cross Talk in Shielded Magnetoresistive Sensors," 2 pages.

Shi et al., "Shield–Related Side Reading in MR Heads," 3 pages.

Min et al., "Track Position Dependence of Performance Attributes in Permanent Magnet Biased MR/SAL Heads," IEEE Transactions on Magnetics, pp. 67–73, vol. 32, No. 1 (Jan. 1996).

Zhu et al., "Narrow Track Recording Characteristics in Thin Film Media," IEEE Transactions on Magnetics, pp. 984–989, vol. 33, No. 1 (Jan. 1997).

*Primary Examiner*—Andrew L. Sniezek
*Attorney, Agent, or Firm*—David M. Sigmond

[57] ABSTRACT

A disk which incorporates a variable-phase servo burst pattern is disclosed. The disk has servo information thereon. The servo information includes a first servo burst pattern written on a first track and a second servo burst pattern written on a second track. Both the first servo burst pattern and the second servo burst pattern have a plurality of transition pulses. The corresponding transition pulses of the first servo burst pattern and the second servo burst pattern are 180 degrees out of phase from one another. Furthermore, a method of writing servo-information which is used to position a magneto-resistive head on a centerline of a track is also disclosed. The method includes the steps of (1) writing a first servo burst pattern on a first track, the first servo burst pattern having a plurality of transition pulses; and (2) writing a second servo burst pattern on a second track, the second servo burst pattern having a plurality of transition pulses, wherein the corresponding transition pulses of the first servo burst pattern and the second servo burst pattern are 180 degrees out of phase from one another.

35 Claims, 4 Drawing Sheets

DISK DRIVE WITH VARIABLE-PHASE SERVO BURST PATTERNS

CROSS-REFERENCE TO RELATED APPLICATIONS

This application is a continuation of U.S. application Ser. No. 08/940,588, filed Sep. 30, 1997 now U.S. Pat. No. 5,923,492.

FIELD OF THE INVENTION

The present invention relates to magnetic storage devices and, more particularly, to magnetic storage devices which employ shielded magneto-resistive (MR) transducer heads.

BACKGROUND OF THE INVENTION

Manufacturers of disk drives have relatively recently moved from using thin-film inductive ("TFI") heads to magneto-resistive ("MR") heads to perform the disk drive's read functions. One of the main reasons for the switch is due to the greater sensitivity of MR heads over TFI heads. As a result, areal densities have dramatically increased.

Due to their sensitivity, however, MR heads sometimes pickup spurious signals emitted by power transformers, motors and the like. In an effort to reduce or eliminate the pickup of the aforementioned spurious signals, disk drive manufactures have placed shields around the MR heads. Such shields, however, have caused additional problems.

Specifically, the shields have been found to be susceptible to variations in their magnetic states. These variations can be magnetically coupled to the MR head which can cause unwanted shield-related side readings. For the most part, the data regions of the magnetic disk have not caused problematic variations in the magnetic state of the shield because the information placed on the disk is written in the data regions in a relatively random fashion. However, the servo regions of the disk have caused problematic magnetic variations in the shields and, hence, problematic shield-related side readings, due to the fact that servo-burst patterns are written in a radially coherent manner.

The above-described shield-related side readings can cause, among other things, a decrease in (1) the linear range of the MR head when reading off-track servo information; and, (2) the off-track signal-to-noise ratio. Furthermore, in extreme cases, the shield-related side readings can cause the disk drive to completely malfunction.

Accordingly, there is a need to minimize and/or eliminate the magnetic variations in the shields which can cause shield-related side readings. The present invention is designed to overcome the aforementioned problems and meet the aforementioned, and other, needs.

SUMMARY OF THE INVENTION

It is an object of the invention to provide a variable-phase servo-burst pattern which can increase: (1) the linear range of the MR head when reading off-track servo information; and, (2) the off-track signal-to-noise ratio.

In accordance with the invention, a disk which incorporates variable-phase servo burst pattern is disclosed. The disk has servo information thereon. In a preferred embodiment, the servo information includes a first servo burst pattern written on a first track and a second servo burst pattern written on a second track. Both the first servo burst pattern and the second servo burst pattern include a plurality of transition pulses. The corresponding transition pulses of the first servo burst pattern and the second servo burst pattern are 180 degrees out of phase from one another.

A method of writing servo-information which is used to position a magneto-resistive head on a centerline of a track is also disclosed. The method includes the steps of (1) writing a first servo burst pattern on a first track, the first servo burst pattern having a plurality of transition pulses; and (2) writing a second servo burst pattern on a second track, the second servo burst pattern having a plurality of transition pulses, wherein the corresponding transition pulses of the first servo burst pattern and the second servo burst pattern are 180 degrees out of phase from one another.

Other objects, features and advantages of the invention will be apparent from the following specification taken in conjunction with the following drawings.

DETAILED DESCRIPTION OF THE PREFERRED EMBODIMENT

Figure 1:
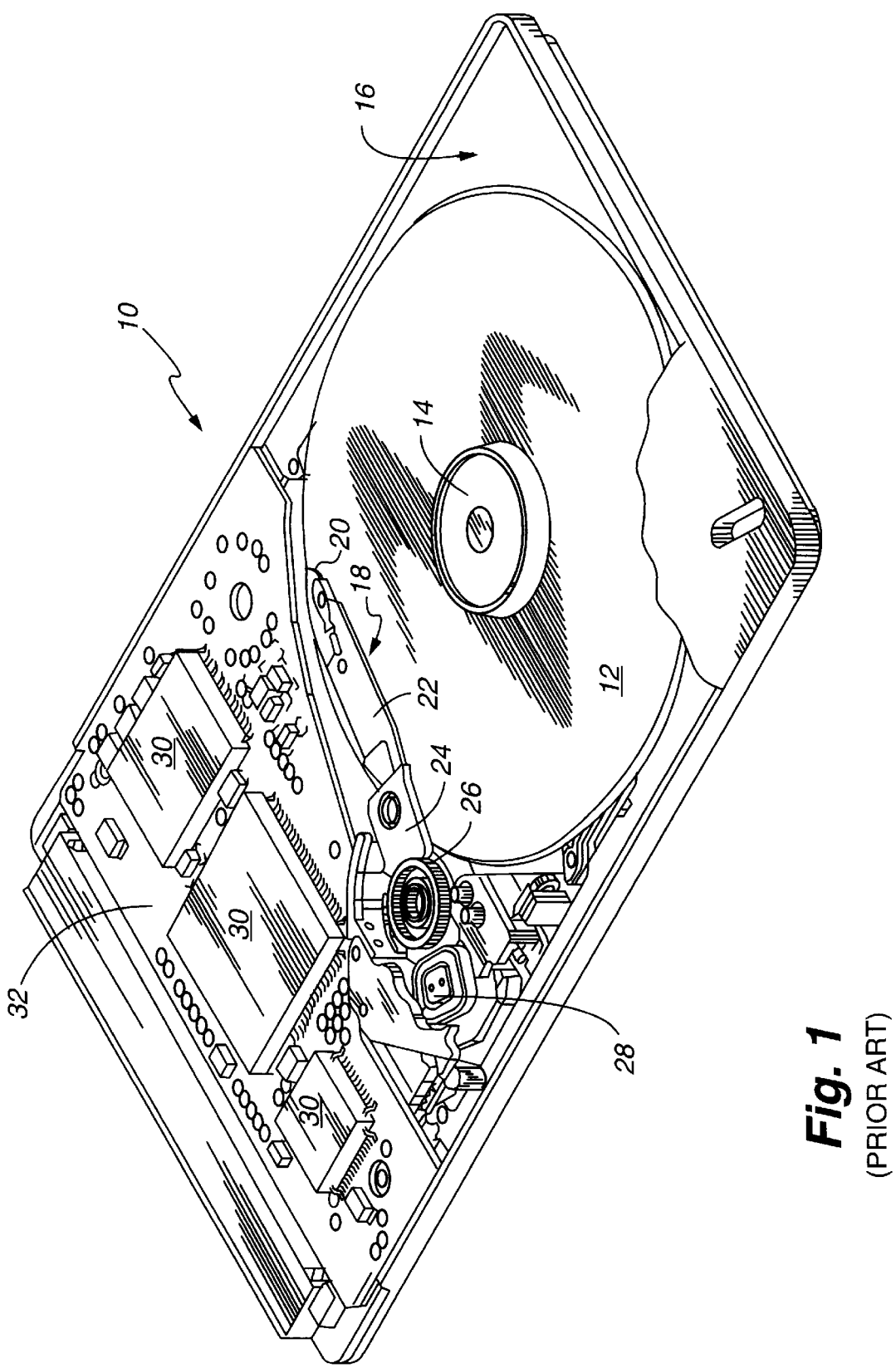
FIG. 1 is a perspective view of a typical disk drive.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

A disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a head 20 mounted to a flexure arm 22 which is attached to an actuator arm 24 that can rotate about a bearing assembly 26. The actuator arm assembly 18 also contains a voice coil motor 28 which moves the head 20 relative to the disk 12. The spin motor 14, voice coil motor 28 and head 20 are coupled to a number of electronic circuits 30 mounted to a printed circuit board 32. The electronic circuits 30 typically include a read channel chip, a microprocessor-based controller and a random access memory (RAM) device.

It should be understood that the disk drive 10 may include a plurality of disks 12 and, therefore, a plurality of corresponding actuator arm assemblies 18. It should also be understood that the principles described below are equally applicable to such disk drives.

Figure 2:
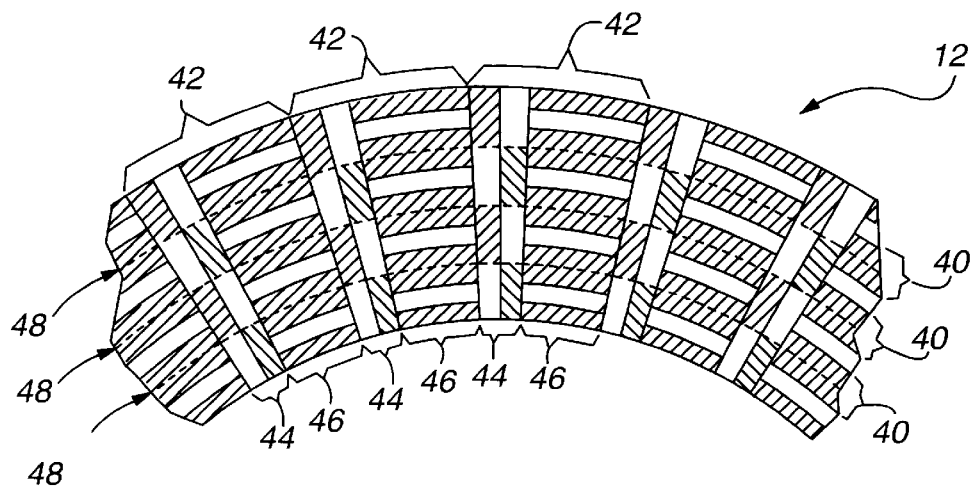
FIG. 2 is a fragmentary diagrammatic representation of a typical disk identifying, among other things, its tracks and sectors.

As shown in FIG. 2, data is stored on the disk 12 within a number of concentric radial tracks 40 (or cylinders). Each track 40 is divided into a plurality of sectors 42. Each sector 42 is further divided into a servo region 44 and a data region 46.

The servo regions 44 of the disk 12 are used to, among other things, accurately position head 20 so that data can be properly written onto and read from the disk 12. Importantly, the servo regions 44 of adjacent tracks 40 are radially aligned with one another (i.e., the servo regions 44 form relatively thin "servo-wedges" around the disk).

As shown in FIG. 2, the data regions 46 are interspersed between the servo regions 44. The data regions 46 are where non-servo related data is stored and retrieved. Such data, upon proper conditions, may be overwritten. Like the servo regions 44, the data regions 46 are radially aligned with one another (i.e., form relatively wide "data-wedges" around the disk).

Each track 40 has a centerline 48 (shown in broken lines in FIG. 2). To accurately write and read data from the data region 46 of the disk 12, it is desirable to maintain the head 20 in a relatively fixed position with respect to a given track's centerline 48 during each of the writing and reading procedures. For simplicity and for purposes of demonstrating the invention, let it be assumed that the head 20 should be positioned on, or substantially on, a given track's centerline 48 to accurately read data from and write data to the data region 46 of that track 40.

Figure 3:
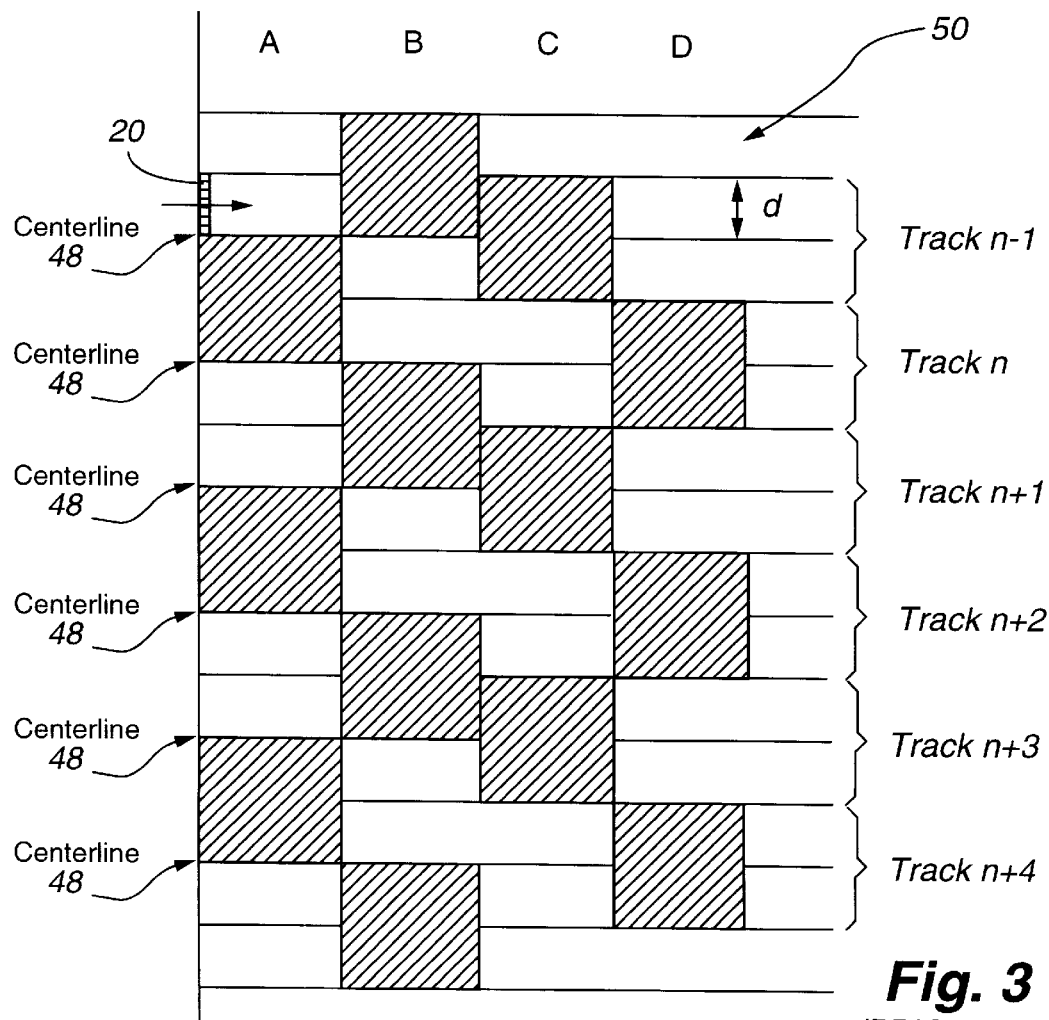
FIG. 3 is a diagrammatic representation of a typical servo-burst pattern.

To assist in controlling the position of the head 20 relative to the track centerline 48, the servo region 44 contains servo information in the form of servo patterns 50 comprised of groups of servo bursts A,B,C,D as shown in FIG. 3. The servo bursts A,B,C,D are accurately positioned relative to the centerline 48 of each track 40, are typically written on the disk 12 during the manufacturing process and, unlike information in the data region 46, may not be over-written or erased during normal operation of the disk drive 10.

During the manufacturing process of the disk drive 10, a servo-track writer ("STW") (not shown) is used to write servo bursts A,B,C,D onto each of the servo regions 44 of the disk 12. In FIG. 3, the distance (d) between each pair of horizontal grid lines represents ½ of the track pitch. Accordingly, each of the servo bursts A,B,C,D depicted in FIG. 3 spans a distance equal to the track pitch (or one track width). Additionally, as depicted in FIG. 3, the head 20 has a width approximately equal to one-half of the track width. Note that the head 20 is purposely shown to be misaligned from the track centerline 48 of track n−1 to more clearly illustrate its width.

With reference to track n, servo bursts A and B are displaced on either side of the centerline 48 of track n. Both servo bursts A and B "contact" the centerline 48 of track n along one of their "ends." Similarly, servo bursts C and D are displaced on either side of the intersection of track n−1 and track n, which is a half track away from the centerline 48 of track n. Both servo bursts C and D "contact" the intersection of track n−1 and track n along one of their "ends."

Additional groups of servo bursts A,B,C,D (i.e., the servo bursts which correspond with track n+2 and track n+4) are in radial alignment with the group of servo bursts A,B,C,D described in connection with track n, as shown in FIG. 3. Accordingly, each one of the A servo bursts are radially aligned with one another, and radially adjacent A servo bursts are spaced apart by the distance of one track width. For example, servo burst A of track n+2 is in radial alignment with servo burst A of track n and is spaced therefrom by the distance of one track width.

Similarly, all of the B, C and D bursts are respectively radially aligned with one another. Furthermore, radially adjacent B, C and D bursts are respectively spaced apart by the distance of one track width. For example, servo burst B of track n+2 is in radial alignment with servo burst B of track n and is spaced therefrom by the distance of one track width. Likewise, the radial alignment and spacing of corresponding servo bursts C and D follow suit. It should be, noted that the space between the servo bursts is not written upon by the STW.

With reference to FIGS. 1–3, as the head 20 is positioned over a track 40, it reads the servo information contained in the servo regions 44 of the track 40, one servo region 44 at a time. The servo information is used to generate position error signals as a function of the misalignment between the head 20 and the track centerline 48. The position error signals are input through a microprocessor which performs calculations and outputs a servo compensation signal which controls the voice-coil motor 28 to place the head 20 over the track centerline 48.

When the head 20 is positioned exactly over the centerline 48 of track n, approximately one-quarter of the A burst will be read followed by one-quarter of the B burst, and their amplitudes will be equal. As the head 20 moves off-track (i.e., off of the track centerline), the amplitude of one burst will increase while the amplitude of the other burst will decrease, depending on the direction of misalignment.

Similarly, if the head 20 is positioned exactly one-half track above the centerline of track n (at the intersection of track n−1 and track n), approximately one-quarter of the C burst will be read followed by one-quarter of the D burst. As the head 20 moves off of the intersection of track n−1 and track n, the amplitude of the either the C burst or the D burst will increase while the other will decrease, depending on the direction in which the head moved. Accordingly, the position error signal can be derived from the relative amplitudes of the A,B,C and D bursts by detecting the readout from the head 20 as it passes over the bursts, and determining the difference in amplitude between the burst pair A and B and the burst pair C and D.

In modern disk drives 10, the head 20 ofthe disk drive 10 of FIG. 1 includes an MR read head and an inductive write head. Because the present invention is directed to one of the special problems associated with MR read heads, no further discussion will be included with respect to inductive write heads.

Figure 4:
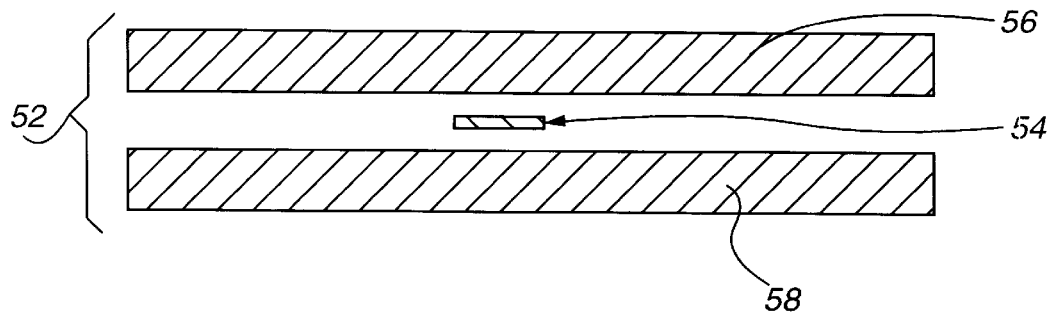
FIG. 4 is a diagrammatic representation of a typical MR read head.

FIG. 4 shows an MR read head 52 which includes, among other things, an MR element 54 sandwiched between first and second shields 56, 58. As illustrated in the figure (which is not to scale), first and second shields 56,58 are large compared to the size of the MR element 54. It is common, for example, for shields 56,58 to span anywhere from 4–12 tracks on either side of the M element 54. Accordingly, each of the first and second shields 56,58 may span 8–24 tracks or more. In contrast, as mentioned above, the MR element 54 is generally about one-half of a track wide (although other element widths may be used in accordance with the present invention).

As mentioned in the background of the invention section, first and second shields 56,58 have been found to be susceptible to variations in their magnetic states. These variations can be magnetically coupled to the MR head 52 which can cause unwanted shield-related side readings. For the most part, the data regions 46 of the magnetic disk 12 have not caused problematic variations in the magnetic state of the shields 56,58. This is because the information stored in the data regions 46 of the disk 12 is written there in a relatively random fashion. Consequently, the positive and negative cycles of the information contained in the data regions 46 tend to cancel each other out.

The servo regions 44 of the disk 12 have caused problematic magnetic variations in the shields 56,58 and, hence, problematic shield-related side readings. This is due to the servo-burst patterns being written in a radially coherent manner (i.e., each of the A,B,C and D bursts are, respectively, radially aligned and in-phase with one another).

The above-described shield-related side readings can cause, among other things, a decrease in (1) the linear range of the MR head when reading off-track servo information; and, (2) the off-track signal-to-noise ratio. Furthermore, in extreme cases, the shield-related side readings can cause the drive to completely malfunction.

Figure 5:
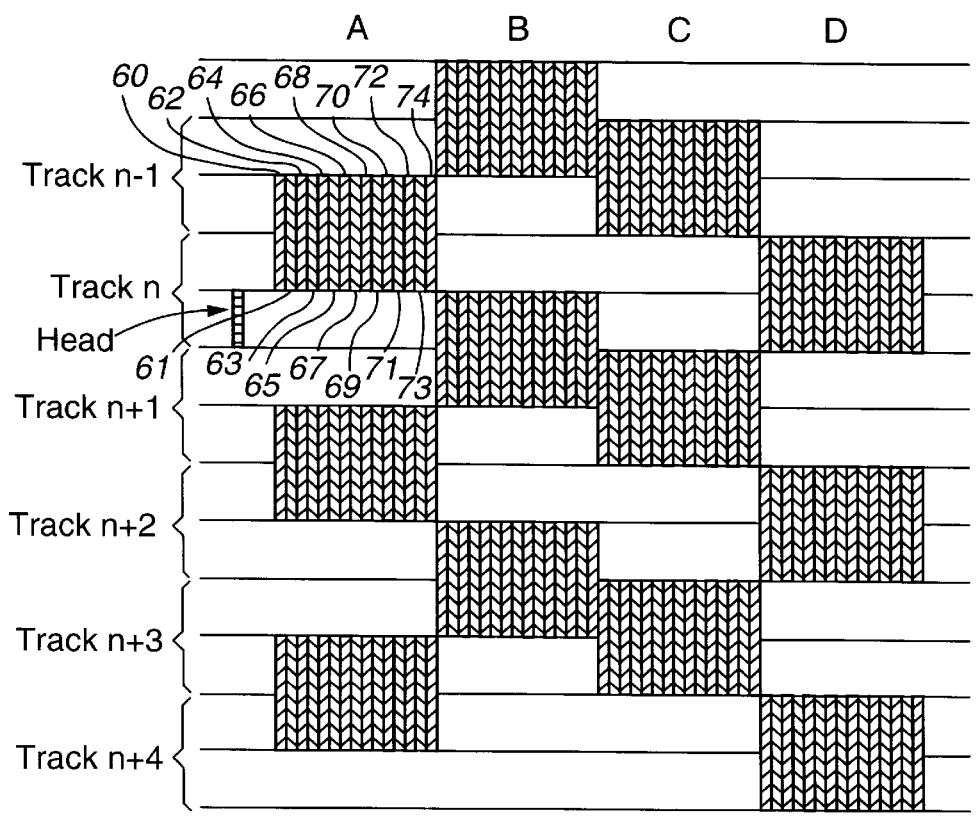
FIG. 5 is a diagrammatic representation of the typical servo-burst pattern of FIG. 3 shown in more detail; and, FIG. 6 is a diagrammatic representation of the servo burst pattern of the present invention.

FIG. 5 shows the servo burst patterns of FIG. 3 in more detail. The horizontal grid markings in FIG. 5 represent half-track spacings, while the vertical grid patterns represent burst cell times.

Each of the servo bursts A,B,C,D includes a plurality of transition pulses which have a length equivalent to one burst cell time. Reference is made, for example, to transition pulses 60–74 of servo burst A between the centerlines of track n−1 and track n. Adjacent transition pulses (for example, transition pulse 60 and transition pulse 61) have magnetic domains that are inverted (i.e., 180 degrees out of phase from one another). The transition pulses with cross-hatching from the lower left to the upper right (e.g. 60, 62, 64, 66, 68, 70, 72 and 74) have a first polarity, while the transition pulses with cross-hatching from the upper left to the lower right (e.g. 61, 63, 65, 67, 69, 71 and 73) have a second polarity that is opposite to the first polarity.

In conventional disk drive systems, like the one shown in FIG. 5, burst patterns are written such that the transition pulses of radially adjacent servo bursts (i.e., servo burst A between the centerlines of track n−1 and track n, servo burst A between the centerlines of track n+1 and track n+2, and servo burst A between the centerlines of track n+3 and track n+4, etc.) have magnetic domains that are in-phase with one another. Therefore, when first and second shields 56, 58 pass over the servo information, the radially adjacent servo bursts cause variations in the magnetic states of the shields 56, 58. These variations are then magnetically coupled to the MR read head 52 resulting in undesirable shield-related side readings.

Figure 6:
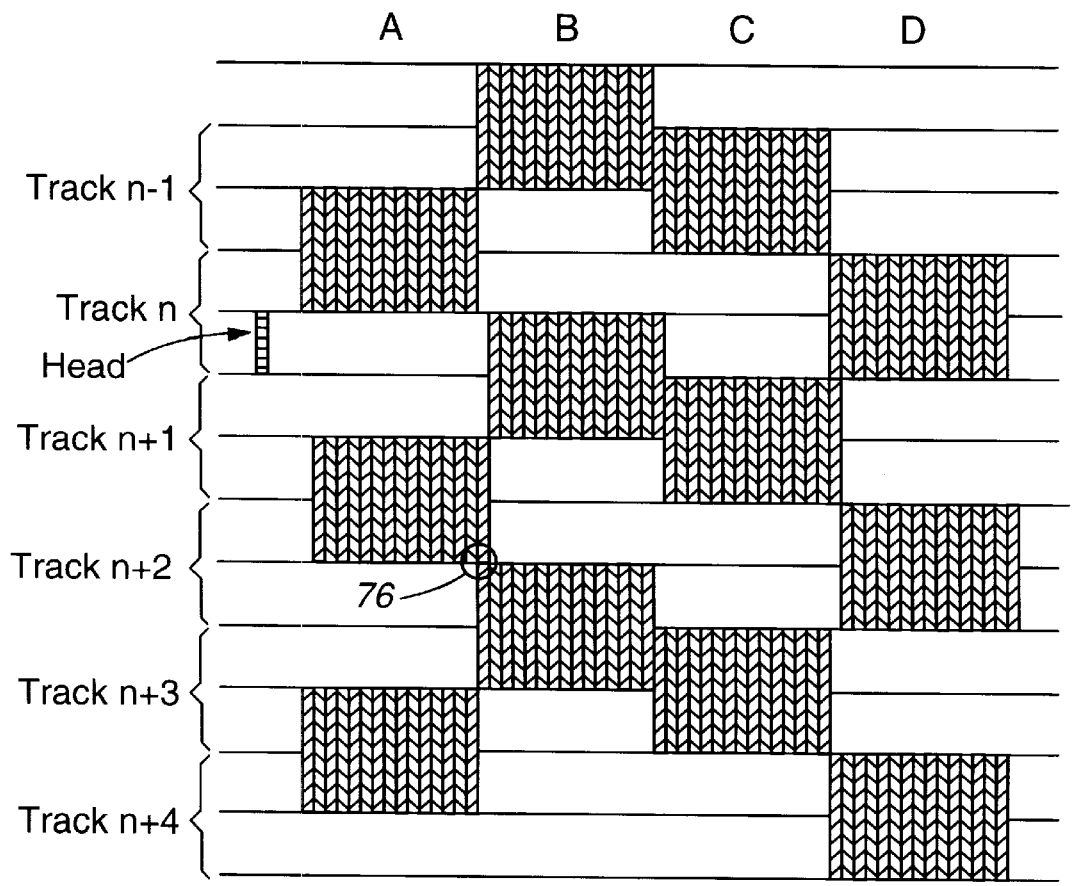

FIG. 6 shows a preferred embodiment of the variable-phase burst pattern of the present invention. The horizontal grid markings represent half-track spacings while the vertical grid markings represent burst cell times.

As shown in FIG. 6, the transition pulses of radially adjacent servo bursts are written 180 degrees out of phase from one another by the STW. This is accomplished by incorporating a "delay" of one burst cell time between radially adjacent servo bursts. Experimental data has shown that, by doing so, the variations in magnetic state of the first and second shields 56, 58 is minimized. Consequently, the linear range of the MR head when reading off-track servo information is improved as is the off-track signal-to-noise ratio.

To illustrate the servo patterns of the present invention with more particularity, reference is now made to FIG. 6. Servo burst A (the servo burst between the centerlines of tracks n−1 and n) is written in standard form. On the other hand, radially adjacent servo burst A (between the centerlines of tracks n+1 and n+2) has been written with a delay of one burst cell time. Therefore, each of the transition pulses of radially adjacent servo burst A is 180 degrees out of phase from the corresponding transition pulses of servo burst A. Consequently, corresponding transition pulses of servo burst A and radially adjacent servo burst A should cancel each other out.

Furthermore, the next radially adjacent servo burst A (the servo burst between the centerlines of tracks n+3 and n+4) is written in standard form and, hence, its transition pulses are 180 degrees out of phase from the transition pulses of radially adjacent servo burst A (the servo burst between the centerlines of tracks n+1 and n+2). The following radially adjacent servo burst A (the servo burst between the centerlines of tracks n+5 and n+6) (not shown) should be written with a delay of one burst cell time and, therefore, its transition pulses should be 180 degrees out of phase from the servo burst defined as next radially adjacent servo burst A. Accordingly, the corresponding transition pulses of the servo bursts defined as next radially adjacent servo burst A and following radially adjacent servo burst A should cancel each other out.

In the present embodiment, when a shield does not span over an even number of radially adjacent servo burst patterns, residual shield-related side readings may be present. In order to minimize the average residual shield-related side readings, transition pulses may be delayed by less than one burst cell time such that the phase difference between radially adjacent servo bursts is further reduced. For example, if it was known that the shield 56 spanned 9 tracks, the phase difference of radially adjacent servo bursts might be set at 45 degrees (360 degrees/8 tracks). As will be understood by those skilled in the art, this would reduce the average residual shield-related side reading as compared to the residual shield-related side reading where the phase difference between radially adjacent servo bursts was 180 degrees.

Accordingly, if the number of tracks spanned by a shield is known (or approximately known), one can incorporate the following phase difference formula:

Phase difference between radially adjacent servo bursts (360 degrees/# of radially adjacent servo bursts spanned by the shield).

With reference again to FIG. 6, one of ordinary skill in the art might note that a potential problem might exist where a "servo burst overlap" occurs, for example, at the last burst cell time of servo burst A between tracks n+1 and n+2 and the first servo burst cell time of servo burst B between tracks n+2 and n+3. For clarity, the servo burst overlap has been circled as region 76 on the figure.

To avoid such a problem, in the preferred embodiment of the invention, during the servo operation, the transition pulses contained in the first and last burst cell times of every servo burst are ignored. As an alternative, spaces may be written between circumferentially adjacent servo bursts (i.e., between servo burst A and servo burst B, between servo burst B and servo burst C, etc.) by the STW to eliminate the overlap. For example, a space having a duration of one burst cell time might be placed between circumferentially adjacent servo bursts.

While the invention has been described in connection with what are conventionally known as quad servo burst patterns, it should be understood that the invention is equally applicable to other types of servoing schemes including dedicated servo, hybrid servo and zoned-sector servo formats that do not use radially aligned servo formats between zones.

It will be understood that the invention may be embodied in other specific forms without departing from the spirit or central characteristics thereof The present examples and embodiments, therefore, are to be considered in all respects as illustrative and not restrictive, and the invention is not intended to be limited to the details given herein.

What is claimed is:

1. A disk drive, comprising:
   a transducer used to read information from a disk; and
   the disk with a first servo burst pattern having first transition pulses on a first track and a second servo burst pattern having second transition pulses on a second track, wherein the first and second tracks are concentric with one another, the first and second servo burst patterns are in a single servo wedge and are substantially but not precisely radially aligned with one another, and the first and second transition pulses are out of phase with one another.

2. The disk drive of claim 1, wherein the first and second servo burst patterns are radially adjacent to one another.

3. The disk drive of claim 1, wherein the first and second servo burst patterns are radially spaced from one another by a radial width of the first track.

4. The disk drive of claim 1, wherein the first and second servo burst patterns each have a radial width equivalent to a radial width of the first track.

5. The disk drive of claim 1, wherein the disk has a quad servo burst format.

6. The disk drive of claim 1, wherein the disk has a dedicated servo format.

7. The disk drive of claim 1, wherein the disk has a hybrid servo format.

8. The disk drive of claim 1, wherein the disk has a zoned-sector servo format.

9. The disk drive of claim 1, wherein the first servo burst pattern is partially but not entirely on the first track, and the second servo burst pattern is partially but not entirely on the second track.

10. The disk drive of claim 1, wherein the first servo burst pattern is entirely on the first track, and the second servo burst pattern is entirely on the second track.

11. The disk drive of claim 1, wherein the first servo burst pattern occupies a first surface area on the disk, the second servo burst pattern occupies a second surface area on the disk, and a majority but not all of the first and second surface areas are radially aligned with one another.

12. The disk drive of claim 11, wherein all of the first transition pulses except a first one of the first transition pulses are radially aligned with the second surface area.

13. The disk drive of claim 12, wherein all of the second transition pulses except a last one of the second transition pulses are radially aligned with the first surface area.

14. The disk drive of claim 1, wherein corresponding ones of the first and second transition pulses are at least 45 degrees out of phase from one another.

15. The disk drive of claim 1, wherein corresponding ones of the first and second transition pulses are 180 degrees out of phase from one another.

16. The disk drive of claim 1, wherein corresponding ones of the first and second transition pulses are between 45 to 180 degrees out of phase from one another.

17. The disk drive of claim 16, wherein the first and second servo burst patterns are radially adjacent to one another.

18. The disk drive of claim 16, wherein each of the first and second transition pulses is one burst cell time in length.

19. The disk drive of claim 16, wherein adjacent ones of the first transition pulses have magnetic polarities that are opposite to one another, and adjacent ones of the second transition pulses have magnetic polarities that are opposite to one another.

20. The disk drive of claim 16, wherein none of the radially adjacent servo burst patterns in the single servo wedge are precisely radially aligned with one another.

21. A disk drive, comprising:
    a magneto-resistive head and a shield associated therewith; and
    a disk with a first servo burst pattern having first transition pulses on a first track and a second servo burst pattern having second transition pulses on a second track, wherein the first and second tracks are concentric with one another, the first and second servo burst patterns are in a single servo wedge, are substantially but not precisely radially aligned with one another, and are spanned by the shield, and the first and second transition pulses are out of phase from one another.

22. The disk drive of claim 21, wherein the first and second servo burst patterns increase a linear range of the magneto-resistive head when the magneto-resistive head reads off-track servo information due to the first and second transition pulses being out of phase from one another.

23. The disk drive of claim 21, wherein the first and second servo burst patterns increase an off-track signal-to-noise ratio of the magneto-resistive head due to the first and second transition pulses being out of phase from one another.

24. The disk drive of claim 21, wherein the first and second servo burst patterns reduce magnetic variations in the shield due to the first and second transition pulses being out of phase from one another.

25. The disk drive of claim 21, wherein the shield spans a maximum number of tracks (X) that intersect the single servo wedge when the magneto-resistive head reads data from the first track, and corresponding ones of the first and second transition pulses are 360/X degrees out of phase from one another.

26. The disk drive of claim 21, wherein each of the first and second transition pulses is one burst cell time in length.

27. The disk drive of claim 21, wherein adjacent ones of the first transition pulses have magnetic polarities that are opposite to one another, and adjacent ones of the second transition pulses have magnetic polarities that are opposite to one another.

28. The disk drive of claim 21, wherein corresponding ones of the first and second transition pulses are out of phase from one another by one burst cell time in length.

29. The disk drive of claim 21, wherein corresponding ones of the first and second transition pulses are between 45 to 180 degrees out of phase from one another.

30. The disk drive of claim 21, wherein none of the radially adjacent servo burst patterns in the single servo wedge are precisely radially aligned with one another.

31. A disk drive, comprising:
    a magneto-resistive head and a shield associated therewith; and
    a disk with a first servo burst pattern having first transition pulses on a first track and a second servo burst pattern having second transition pulses on a second track, wherein the first and second tracks are concentric with one another, the first and second servo burst patterns are in a single servo wedge and are radially adjacent to one another, the first servo burst pattern occupies a first surface area, the second servo burst pattern occupies a second surface area, a majority but not all of the first and second surface areas are radially aligned with one another, and the first and second transition pulses are out of phase from one another.

32. A disk drive, comprising:

a magneto-resistive head and a shield associated therewith; and a disk with a first servo burst pattern having first transition pulses on a first track and a second servo burst pattern having second transition pulses on a second track, wherein the first and second tracks are concentric with one another, the first and second servo burst patterns are in a single servo wedge and are radially adjacent to one another, and corresponding ones of the first and second transition pulses are between 45 to 180 degrees out of phase from one another.

33. A disk drive, comprising:

a magneto-resistive head and a shield associated therewith; and a disk with a first servo burst pattern having first transition pulses on a first track and a second servo burst pattern having second transition pulses on a second track, wherein the first and second tracks are concentric with one another, the first and second servo burst patterns are in a single servo wedge and are radially adjacent to one another, and a linear range of the magneto-resistive head is increased when the magneto-resistive head reads off-track servo information due to the first and second transition pulses being out of phase from one another.

34. A disk drive, comprising:

a magneto-resistive head and a shield associated therewith; and a disk with a first servo burst pattern having first transition pulses on a first track and a second servo burst pattern having second transition pulses on a second track, wherein the first and second tracks are concentric with one another, the first and second servo burst patterns are in a single servo wedge and are radially adjacent to one another, and off-track signal-to-noise ratio of the magneto-resistive head is increased duE to the first and second transition pulses being out of phase from one another.

35. A disk drive, comprising:

a magneto-resistive head and a shield associated therewith; and a disk with a first servo burst pattern having first transition pulses on a first track and a second servo burst pattern having second transition pulses on a second track, wherein the first and second tracks are concentric with one another, the first and second servo burst patterns are in a single servo wedge and are radially adjacent to one another, and magnetic variations in the shield are reduced due to the first and second transition pulses being out of phase from one another.

* * * * *